June 6, 1972 M. K. BRANDT 3,667,917
CHROMATOGRAPHY APPARATUS AND METHOD
Filed Nov. 27, 1970 5 Sheets-Sheet 1
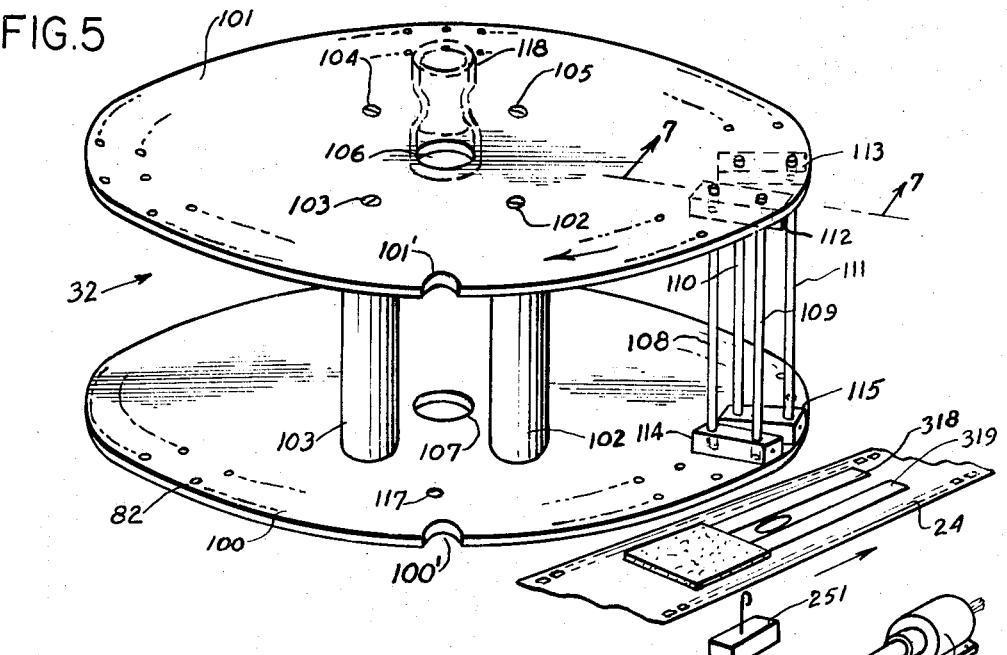
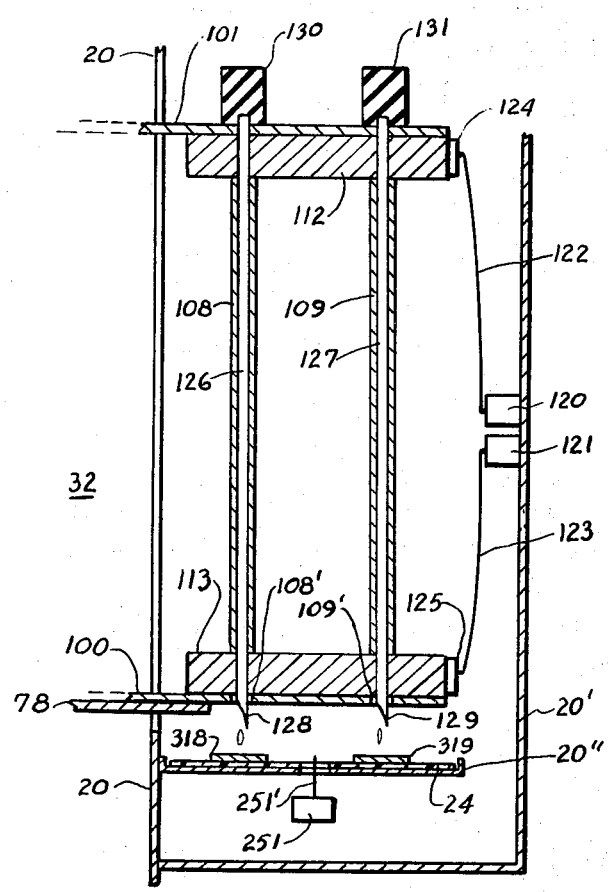
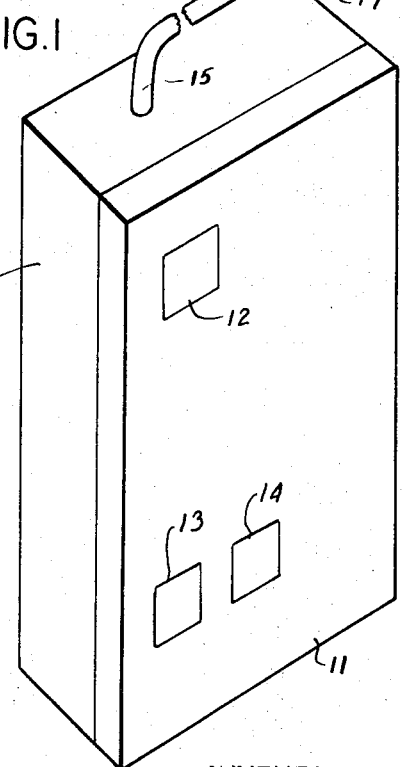
INVENTOR.
MARCUS K. BRANDT
BY
ATTORNEY

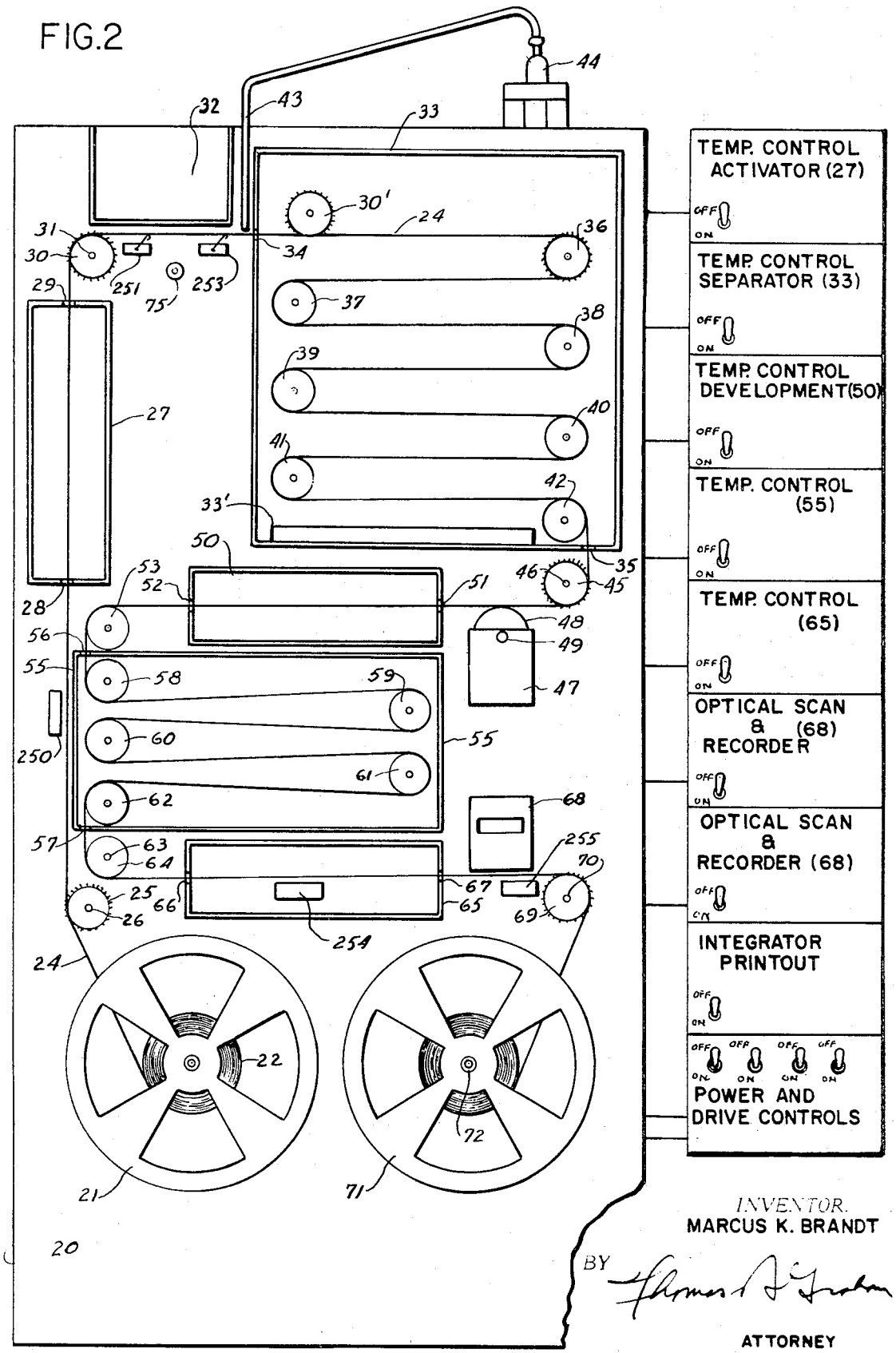

June 6, 1972   M. K. BRANDT   3,667,917
CHROMATOGRAPHY APPARATUS AND METHOD
Filed Nov. 27, 1970   5 Sheets-Sheet 3

INVENTOR.
MARCUS K. BRANDT
BY
ATTORNEY

June 6, 1972 M. K. BRANDT 3,667,917
CHROMATOGRAPHY APPARATUS AND METHOD
Filed Nov. 27, 1970 5 Sheets-Sheet 4
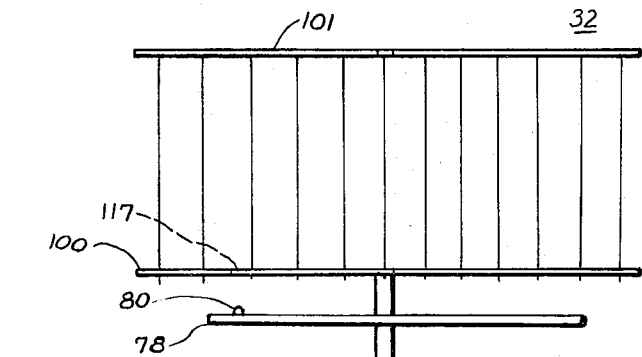
FIG.6
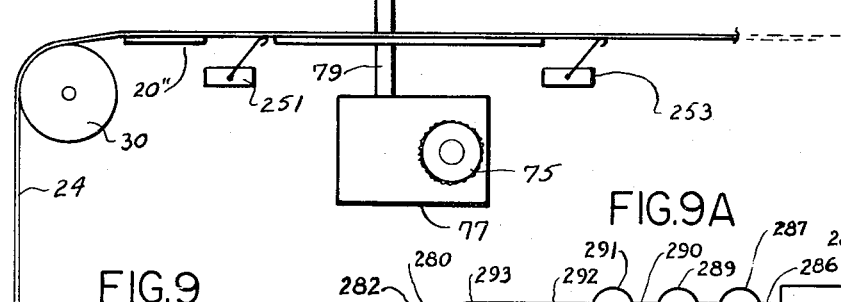
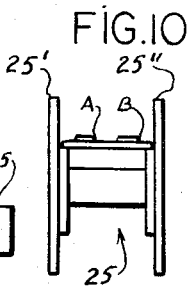
FIG.10
FIG.9A
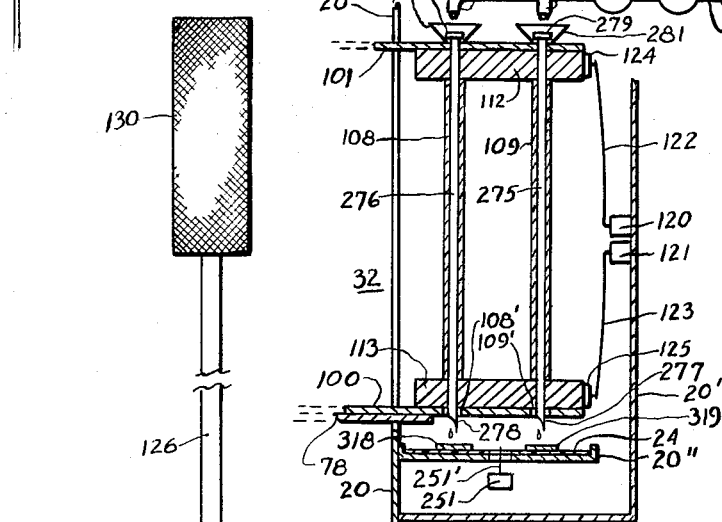
FIG.9
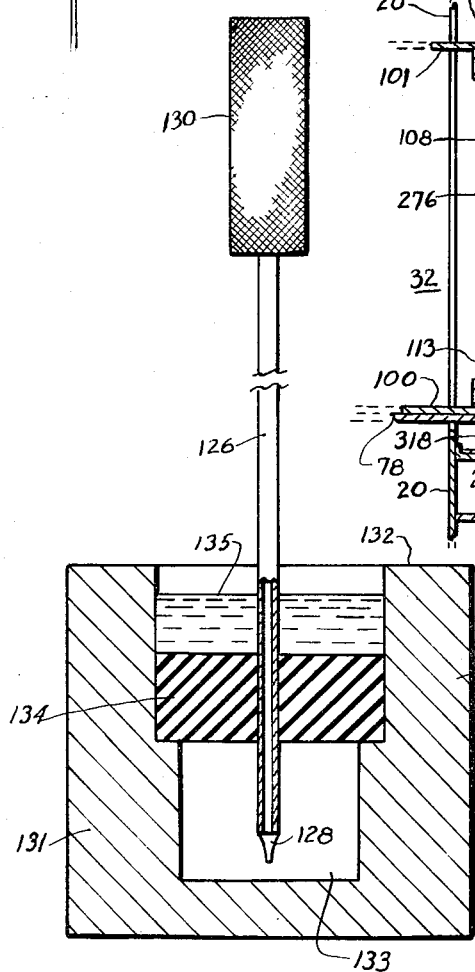
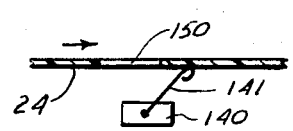
FIG.8A
FIG.8B
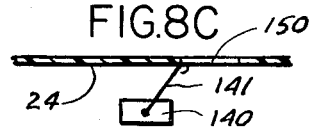
FIG.8C
*INVENTOR.*
MARCUS K. BRANDT
BY Thomas A Graham
ATTORNEY June 6, 1972 M. K. BRANDT 3,667,917
CHROMATOGRAPHY APPARATUS AND METHOD
Filed Nov. 27, 1970 5 Sheets-Sheet 5
FIG.11
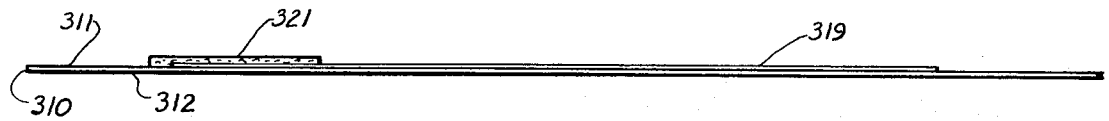
FIG.12
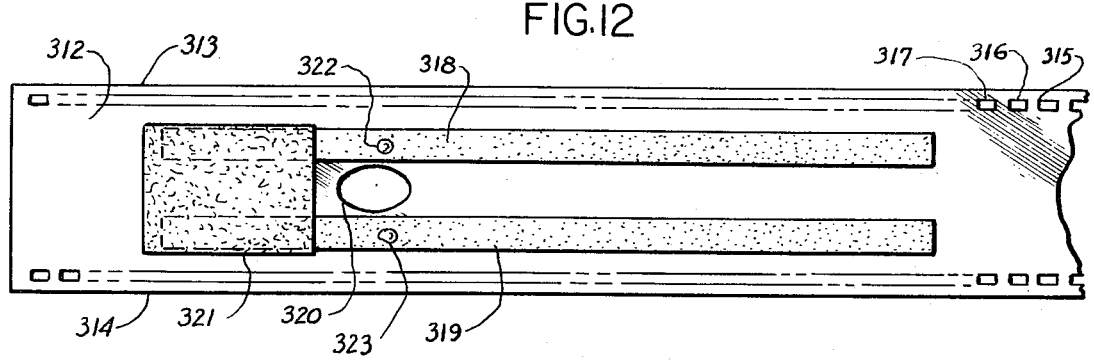
FIG.13
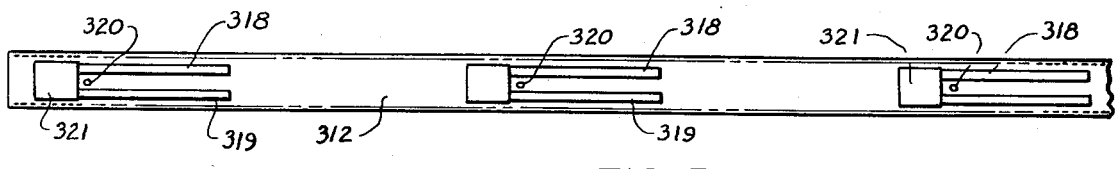
FIG.15
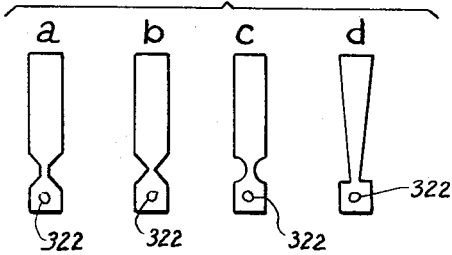
FIG.14
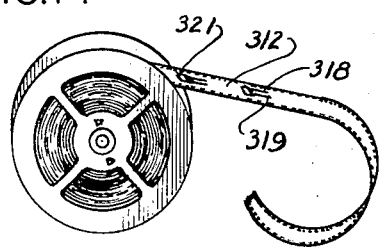
INVENTOR.
MARCUS K. BRANDT
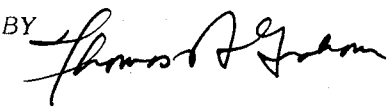
ATTORNEY

3,667,917
CHROMATOGRAPHY APPARATUS AND METHOD
Marcus K. Brandt, Easton, Pa., assignor to J. T. Baker Chemical Company, Phillipsburg, N.J.
Filed Nov. 27, 1970, Ser. No. 93,064
Int. Cl. B01d *15/08;* G01n *31/08*
U.S. Cl. 23—230 R                  20 Claims

ABSTRACT OF THE DISCLOSURE

Method and apparatus for automatically performing manipulations in thin layer chromatography, whether it be horizontal or vertical, continuously, including coordinated mechanism for automatically applying sample to chromatographic test areas in sequence on a unitary base, mechanism for moving such test areas continuously into contact with solvent, and mechanism for activation of developing, color reaction, delay, drying, and densitometric analysis, as well as feed and take-up, the apparatus including means responsive at intervals to indicia on the base related to the chromatogram to activate and deactivate portions of the apparatus and to relate the chromatograhic operations to the progress of the chromtographically active areas through the machine.

BACKGROUND OF THE DISCLOSURE

The current state of chromatographic art is essentially a manual analytical technique wherein chemical substances can be separated and identified and quantitatively measured, if desired. The process is dependent upon differences in adsorption of substances in a mixture on an adsorbent material on an inert base. Operations in paper chromatography or glass plate chromatography involve manually applying spots to a so-called origin, having a solvent migrate continuously over the spots, the solvent thus carrying the substances over certain distances on the paper, or adsorptive material on glass as it migrates up the adsorbent layer, each distance being proportional to the partition coefficient of the substance, the properties of the paper, or adsorptive materials, the duration of solvent flow, the nature of the solvent, surrounding temperature, and the chemical similarity of the compounds within the mixture to each oher. After suitable separation has been accomplished, the spots are literally fixed in place on the chromatographically active area by drying and, then, if they are not inherently colored or visible they are made visible by developers. The developers can be ultra-violet light, radioactive materials, or chemicals sprayed onto the chromatographic area to induce color reaction with the substances which have been separated.

The conventional chromatography apparatus is some form of chromatographic chamber or enclosure which can be saturated with solvent vapor and be kept saturated with solvent vapor in the separation phase of the analysis. Generally, the apparatus consists of a container enclosing a tray of solvent and means for hanging a chromatographic base in static position such that it is wetted by the solvent and the solvent can migrate up into he chromaographic area.

Thus, the operation is inherently a manual one, end, in view of the number of variables involved, calls for general intelligent attention of an operator to coordinate the solvent wtih materials being analyzed and the length of time required to accomplish a given separation. Generally, in many kinds of research, numbers of analyses are needed and, as a consequence, the method of chromatographic analysis has the inherent limitation that the level of manual attention required seriously limits the extent of the application of the technique.

This invention has a basic object the standardization of a particular chromatographic analysis to the point where large numbers of such analyses can be conducted automatically by a machine programmed to carry out sampling, solvent application, separation, color development, and optical scanning, coupled with recording.

The invention has as another object, the mechanization of chromatographic analyses to the point of making it possible for a machine to conduct large numbers of similar analyses and to record the results and to effect this in a highly reproducible fashion.

Other objects and advantages of this invention will in part be apparent and in part appear hereinafter from the detailed description and drawings.

DETAILED DESCRIPTION OF THE INVENTION

The apparatus of this invention thus consists of a means for automatically carrying out a sequence of chromatographic analyses, which may be a long sequence on similar or different samples, the apparatus comprising a combination of a pair of reels, one being a first, tape-carrying reel and the other a second, tape-collecting reel, said first real carrying a flexible tape characterized by its having a surface thereof coated at spaced intervals with an adsorbent material, to provide for a multiplicity of chromatograms on said tape, each of said adsorbent areas being in contact with a solvent reservoir area on said tape, and on said tape indicia marking the precise location of each adsorbent area, and a sequence of separate zones in said apparatus to receive said tape and providing for activation of chromatographic area, application of sample to an origin in response to indicia, application of solvent to the reservoir, and thereafter, sufficient delay to permit completion of a chromatographic separation, development with a reagent, if necessary, drying, and optical scan, all being keyed to the indica on said tape, to identify each optical scan survey with a chomatogram on an identified area of said tape. The method involves the use of this tape material to make possible a long sequence of analyses conducted singly, in duplicates, triplicates, or quadruplicates, arranged side by side, using small samples, each paired, tripled, or quadrupled set of analyses being triggered by the indicium identifying the test area. The development and all proceedings involving the preliminary drying application of solvent, color reagent, drying, take-up, and storage of the chromatograms form part of the overall method of automatic thin layer chromatography analysis. It is, of course, evident that the indexing of samples and response of indexing mechanism to the indicia of said tape are all coordinated to identify sample or samples with area or areas on said tape, the individual areas being identified and their identification and scanning being coordinated with optical scanner equipment provided in the apparatus. It is apparent that an optimum method is the parallel side-by-side arrangement of areas and that this calls for dual optical scanning. Triple or quadruple areas would call for triple and quadruple scanning respectively. The optical equipment can be standard ultra-violet fluorescence or visible reflectance on a chromatographic scanner, wherein a beam of light is directed onto the chromatogram and transmission through or reflectance on the surface is used to measure the amount of each substance which has been separated by the chromatographic process. Each of the zones or compartments for activation, development, and solvent drying can be and preferably is separately heated and maintained at a predetermined temperature for the type of analysis and apparatus. The electrical and electronic circuits involving the heating and adjusting thereof may be direct heating potentiometers with conventional controls and the details of the circuits form no part of the invention.

The solvent application means is a pump which is activated by the indicia on the tape, in timed sequence.

so as to eject a reproducible predetermined volume of solvent, usually 0.2 to 2.0 milliliters, to saturate the reservoir area carried by the test tape from which the chromatogram is made. The sponge or reservoir is so affixed that it is in intimate contact with the adsorbent on the test tape. The amount of solvent determines in part the extent of development of the chromatogram.

The apparatus, of course, is especially designed to serve for use in installations requiring large numbers of analyses in reproducible style such as chemical plants for control purposes or hospitals for much routine testing, so that the nature of the chromatographic adsorptive material to be used and the particular combination of solvent, zones, temperatures, and reagents will vary and depend on the exact nature of the testing to be performed. In hospitals, for example, certain blood analyses will require one combination of adsorptive material and solvent, whereas the analysis of other body fluids will call for different combinations of adsorptive materials, solvents, and parameters in the development zones.

It is to be understood that the appartaus is concerned with the provision of means for transporting a tape, suitable for conducting such sequence or large number of tests, of a similar or dissimilar nature, in spaced, timed sequence and the apparatus is adaptable, by adjustment, for use in a variety of chemical tests. Thus, the combination consists of the features of construction, combinations of elements and arrangements of parts, hereinafter described in further detail and the method involves the manipulation of the apparatus including the steps of manipulating tapes of particular chromatographic capabilities into and through the separate compartments to separate substances on a sequence of chromatograms followed by final survey.

In the drawings:

FIG. 1 is an overall general view in perspective of an embodiment of an apparatus made in accordance with the invention showing it enclosed within a solvent vapor confining cover;

FIG. 2 is a front elevation of the machine showing its parts exposed to indicate the relationship of the long tape to the steps involved in the development of the chromatogram;

FIG. 5 is a perspective view of a sample basket useful in the machine for carrying a large number of samples in such relationship that they can be deposited on test tape in known sequence;

FIG. 6 is a front elevation showing the relationship of sample basket to its drive mechanism and chromatographic tape;

FIG. 7 is a longitudinal section through a pair of sample carriers in the sample basket to show the relationship of the carriers and basket to the tape; it would correspond to a section taken on 7—7 of FIG. 5;

Figure 4:
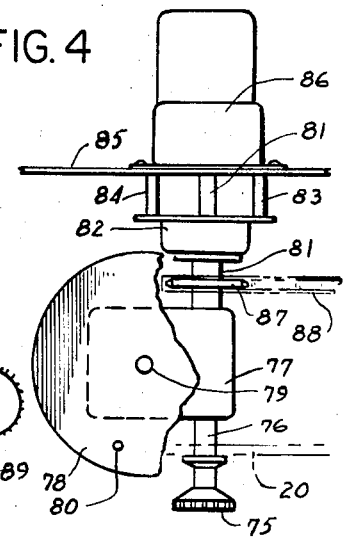
FIG. 4 is a plan view of the drive mechanism for the machine, correlated with FIGS. 2 and 3.

FIGS. 8A–B–C is a diagrammatic view of the tape and switch mechanism for activating the machine and the several operations performed by it;

FIG. 9 is a longitudinal section through a sample tube and device;

FIG. 9A shows an alternative form;

FIG. 10 shows a form of spool useful for guiding the tape;

FIGS. 11, 12, 13, 14, and 15 show a specific preferred form of tape with chromatographic areas useful for purposes of this invention.

In FIG. 1, 10 represents the machine with a front cover 11, with openings, i.e., 12, 13 and 14 to provide manual access to parts of the machine. This form of structure is desirable because chromatographic procedures often call for solvents which are best not inhaled. Hence, the installation should also include a vent connection 15 powered by blower 17. Once the machine is loaded with tape and solvent and placed in operation the blower is activated and the operation proceeds. Effectively it is thus under a ventilated hood.

The general construction, arrangement and operation of the machine is best understood by reference to FIG. 2 in detail. It is apparent that the cover or hood has been removed. Similarly, individual chamber or zone covers in the chromatographic development chain have been removed to permit tracing the course of analysis.

In FIG. 2, 20 represents a base plate constituting a main base or chassis of the machine carrying its parts. At a suitable level, for example, near the bottom of the base plate is supply reel 21 having axle 22, which is carried on a bearing in the base plate 20 of the machine. Supply reel 21 carries chromatographic tape 24, subject of copending application Ser. No. 93,299, entitled Chromatographic Material, filed of even date herewith, to be considered fully incorporated herein and is included in this specification. Tape 24 which for purposes of a preferred embodiment may be assumed to have the form of a 35 millimeter photographic film, passes over guide reel 25 mounted on axle 26 on base 20, the guide reel 25 being a sprocket with circumferentially spaced teeth to engage edge perforations in tape 24. The tape 24 is fed through activation zone 27, an enclosed chamber carried on the base 20 and characteristically being elongated, and having open slots 28 and 29 to permit passage of the tape through the chamber 27. Zone 27 is equipped with a hinged cover plate, not shown, and with heating coils and temperature controls to permit holding a predetermined temperature, for example, between 100° C.–110° C. The tape 24 passes over guide reel 30 carried on axle 31, this guide reel 30 being a sprocket having circumferential teeth to engage edge perforations in the tape 24. The tape is then passed in receiving relationship to a sample application zone or system 32, which is described in detail herein in one embodiment, and from the sample application system 32 it passes into the chromatogram development delay zone 33, which is an enclosed chamber having two openings, a first, 34, for entry of the tape 24, and a second 35, for exit of the tape 24. The hinged cover plate for zone 33 is not shown. This zone is also provided with heating coils and temperature sensing and control means to permit holding a determined temperature. Within the closed chamber 33 is the chromatogram development delay line which characteristically consists of a sequence of spools to receive and guide the tape 24 over an elongated path and thereby create a time delay. Shown here are spools 30', 36, 37, 38, 39, 40, 41 and 42. Close to the point of entry of the tape into the chromatogram development line, solvent application is made by means of solvent applicator 43 connected to source 44 of the development solvent. Solvent applicator 43, may, if desired, be made to apply solvent just before the point of entry into the development zone or just after the point of entry. Here application is shown just as the tape enters chamber 33. The atmosphere in chamber 33 is kept saturated with solvent vapor by providing tray 33' to hold a volume of solvent, which will take the temperature of the chamber, i.e., 20°–30° C., room temperature. Actually, the specific temperature employed will be determined by the analysis to be conducted. Solvent source 44 is merely a pump and container with discharge connected by plastic catheter 43 to an appropriate spot for application of solvent to the tape. Subsequently, from the exit 35, the tape 24 passes over guide reel 45, mounted on the base 20 on axle, 46. The tape 24 then passes over the color development reagent applicator 47, which also is mounted on the base 20 and may consist of the roller 48, on axle 49. This is, of course, optional depending on the nature of the chromatogram to be produced and in some types of analyses is omitted. The tape 24 then passes into color development and solvent removal 50 which also is a closed chamber, equipped with a hinged cover, not shown, having a narrow slot 51 at one end for entry of tape 24 and slot 52 at the other end for exit of the tape 24.

The tape 24 then passes over guide roller 53 mounted on the base 20 on axle 54 into color development and solvent removal chamber 55 which has an entry slot 56 and exit slot 57. Color development chamber 55 is also equipped with a hinged cover plate, not shown herein, and heating and temperature control. Within the color development chamber is the delay line system consisting of guide rollers 58, 59, 60, 61 and 62. Use of the color development chamber is optional. It depends on the nature of the chromatogram to be developed. Actually it is used only when a second reagent is used to develop color.

The tape 24 exits from the development chamber and passes over reel 63, mounted on axle 64, following which it is guided into solvent drying oven 65 which is a closed chamber having one entry slot 66, and exit slot 67 for passage of the tape 24. Drying oven 65, like the other chambers 27, 33, 50 and 55, is equipped with a hinged cover, heating means and temperature control means, all of which are conventional and not shown.

Each of the chambers 50 and 55 may be equipped with a solvent tray to keep the atmosphere therein saturated with vapor as the needs of the analysis may dictate.

By this time the substances in each chromatogram should be separated and the chromatogram should be fully visualized ready for scanning and, accordingly, after passing through the solvent drying oven 65, the developed chromatogram is surveyed by a chromatographic optical scanner 68, or a plurality of such scanners depending upon whether the tape carries one or more parallel tracks to be scanned. The scanner may be conventional UV or visible reflectance type and, of course, is connected to recording devices, and integrator printout as desired, which in and of themselves form no part of this invention and, accordingly, the scanner, recorder, and printout are shown in block form.

The tape 24 then passes over guide reel 69, a sprocket, mounted on axle 70 to be taken up on reel 71 mounted on axle 72.

Hence, preparation of chromatograms is a once-through, continuous operation, but delay can be varied by the inclusion or removal of one or more loops in the chamber 33. In similar fashion the color development delay line in the oven 55 is variable and can be matched to the needs of the operation by adding or removing an appropriate number of spools. The overall sequence can be shortened by skipping a number of spools in chamber 33 to pass the tape straight through. Similarly, the tape can be passed straight through chamber 55 if it is not needed in an analysis.

It is important that the tape be oriented with its chromatographic test area face up and that the spools be constructed so that the chromatographic area is untouched throughout the process. The orientation of tape is controlled by the arrangement and number of spools used. A useful form for edge handling of tape is shown in FIG. 10. Details of the tape useful in the machine are shown in FIGS. 11, 12, 13, 14 and 15.

The solvent drying oven 65 is generally held at a fixed temperature because the removal of solvent used for the development of the chromatogram is a drying operation and with the tape 24 moving a few millimeters per second a single straight through operation can be adequate. Temperature adjustment to match rate of travel is a basic control.

It is apparent, also, that variation in the total time of the operations can also be had by speeding or reducing the rate of travel of the tape.

Thus, the apparatus is useful for taking an elongated tape for recording the development in sequence of a large number of chromatograms and control the movement of the tape at a steady rate through a proper sequence of zones. Details of a drive mechanisms are shown in FIG. 3.

Figure 3:
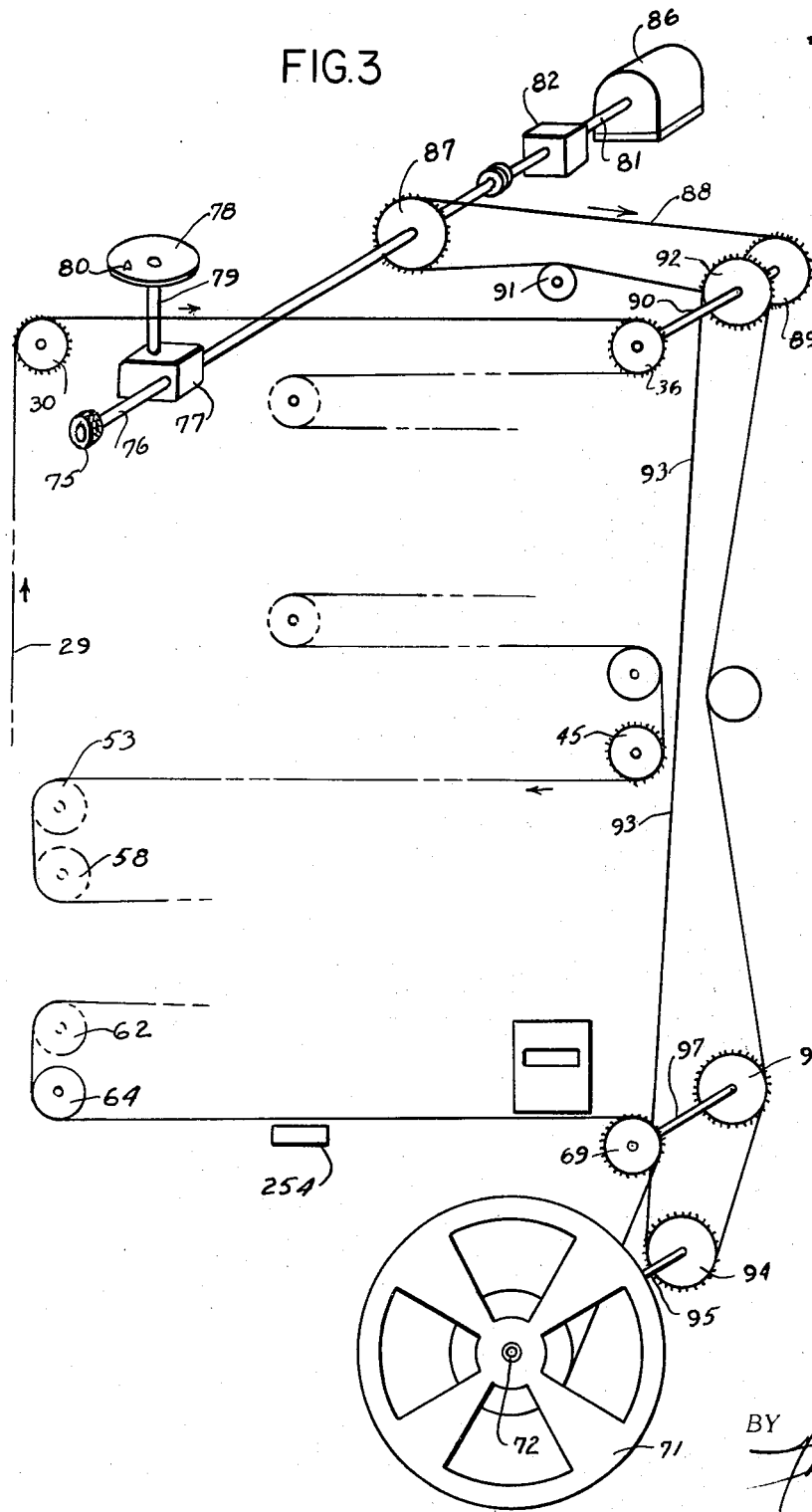
FIG. 3 is a schematic diagram of the machine corresponding to FIG. 2 to show the internal relationship of driving parts of the mechanism to the supply and take-up reels as well as driven spools.

Referring now to FIG. 3 there is shown in a schematic form a diagram of the drive mechanism for the tape. The drawing is coordinated with FIG. 2 and the tape and spools shown on the front face of the base 20 of the machine in FIG. 2 are positioned in this diagram. The base 20 has been removed and the drive mechanism is shown in an extended form with the parts separated so that they can be more clearly visualized in relation to the functions performed in operating the machine and driving the tape through the sequence of steps and operations mentioned in connection with FIG. 2.

Thus, in FIG. 3 the tape 24 is shown, with guide reels, 36, . . . 45, 53, 58, 62, 64, 69, to be collected on reel 71 as in FIG. 2. The remainder of the mechanism is shown to illustrate the drive and in the drive mechanism movement is taken from the single motor and the single shaft as shown in FIG. 4.

Thus, in FIG. 4, 20 represents the base of the machine and 75 a manual positioning knob connected through shaft 76 to gear reducer 77 as indicated.

The gear reducer, which is a right angle reduction, provides a mechanism for receiving and holding the sample basket indicated as the basket platform 78 carried by upstanding shaft 79, which platform also has a male detent 80 carried in it. Driving the gear reducer is shaft 81 connected to magnetic clutch 82, and past spacers 83 and 84 to a bracket support 85 mounted on the base 20 serving as the support of the drive motor 86. Carried on the shaft 81 is the sprocket 87 engaging chain 88. (The orientation of these parts in the machine is indicated on FIG. 2 by the placement of the manual knob 75 and the rest of the mechanism is generally under and behind the sample application zone 32). Manual knob 75 permits movement of sample basket in zone 32 to position a sample in a number one starting position.

In FIG. 3 the parts are readily identifiable and have been correspondingly shown in the expanded schematic perspective diagram. Sprocket 87 engages chain 88 which engages sprocket 89 on shaft 90, which drives the sprocket 36 which is a guide spool for the tape. To adjust chain 88 to an appropriate degree of tightness idler 91 engages chain 88. A second sprocket 92 is carried by shaft 90 and engages chain 93, which in turn meshes with sprocket 94 carried by shaft 95 which also drives spool 71, the take-up spool for completed tapes. Chain 93 engages a second sprocket 96 carried by shaft 97 which also drives spool 69.

For the purpose of actually guiding the edge-perforated tape carrying the chromatographic test areas, spool 30 mounted on the front face of the machine is formed as a sprocket with teeth spaced to engage the perforations of the tape. The same is true of spool 36, which is a driven spool. Similarly, 45 and 69 are sprockets, engaging the tape. In the development oven 33, for accuracy in guiding the tape, spool 30' is a sprocket mounted on the base accurately aligned with spool 30 to assist in maintaining alignment of the tape with driven spool 36, through the sampling mechanism and through the oven.

Referring now to FIG. 5, the details of the sample carrier, or sample basket, can be traced. This is one form of mechanism which is generally identified as sample applicator 32 in FIG. 2. Its function is to carry a number of samples to be analyzed, to carry the samples into sample-delivery position in timed relation to the chromatographic tape strip passing in sample-receiving relationship thereunder and then to move into a new position for delivery of the next sample as the next sequential chromatographic test area comes into position to receive a sample.

The sample carrier 32 consists of a pair of disks 100 and 101 held together in any suitable manner in spaced relationship, e.g., by spacers 102, 103, 104 and 105. Centrally oriented in the structure comprising the spaced disks is an axis which may be as simple as a pair of aligned openings, here indicated as 106 in the upper disk and an opening 107 in the lower disk. Radially, arranged around the disks are sample receiving sleeves 108, 109, 110 and 111, etc. set in the upper disk in contacts 112, 113, and in 114, and 115 in the lower disk. Such pairs of sleeves and contacts are spaced around the circumferences of the disks 100 and 101. A useful number is obtained by employing a 10° spacing to give 36 pairs or 12° to give 30 pairs in each disk.

Each pair of resistance sleeves in each disk is set in conductive electrical contacts. The contacts are of copper or brass and the sleeve of any resistance alloy suitable for forming a tubular resistance heater. It is, of course, understood, that the disk 100 and 101 are electrical insulating material which may be of any suitable composition. Generally, the resinous base material used as base for printed electronic circuit work is suitable. Additionally, at any point in the circumference of disks 100 and 101 notches 100' and 101' are placed. These are also axially aligned and are for the purpose of permitting the basket to pass physical electrical contacts on the base when it is slipped into place on shaft 79. Also at any point in the lower disk 100 there is the opening 117 which serves as a female detent to engage the male detent connection 80 in the basket carrier 78. Any suitable latch for engaging the shaft 79 can be provided on disk 101, here indicated as latch 118.

The purpose of the detent and latch is to give the basket one fixed position on the turntable to which it can be latched, so that once engaged and its position known each sample carrying sleeve, etc. around the circumference has a fixed known relationship to the physical position of the basket.

Shown in aligned relationship to the basket is the chromatographic tape 24 oriented so as to have its adsorptive areas 318 and 319 in appropriate relationship to the basket to receive samples. The direction of the movement of the tape and the basket are indicated by arrows.

Additional detail of the orientation of the sample carrier is shown in FIG. 6 where the tape 24 is shown on spool 30 and directed to the separation oven 33.

Knob 75 and reducing gear 77, which drives right angle shaft 79, are shown. Basket 32 is placed on the shaft 79 and oriented so that the male detent 80 engages the female detent 117 in the disk 100 of the basket 32.

In FIG. 9 there is shown a sample carrier and filling mechanism. The sample carrier consists of a needle 126 having a point 128 and handle 130. The needle is a typical hollow surgical needle mounted on the solid base, or handle, which generally for convenience will be a knurled knob.

The device and sample filling mechanism, adapted to filling needles to a uniform degree, consists of a cylindrical base 131, defining a central volume 133 which is evacuated and sealed with a rubber septum 134. The septum is a few millimeters below the top edge 132 of side wall 131. The purpose of the vacuum is to evacuate the needle 126 and to fill it upon withdrawal. Thus, the operation of the device is as follows: The liquid 135 which is to be sampled is placed in the reservoir defined by the wall 131 and the rubber septum 134. The clean needle 126 is inserted through the liquid 135 and the rubber septum 134. As it enters the evacuated chamber 133, it is thoroughly evacuated. Upon withdrawal the needle is backed through the rubber septum 134, the point is backed through the liquid 135 to be sampled and an amount of liquid, determined by the degree of the evacuation of the needle, is instantly drawn up into the needle 126. With standardized evacuated containers and needles of standardized dimensions reproducible results in sampling can be had. The degree of precision depends, of course, on the precision or tolerance in the manufacture of the needles and the exact reproducibility of the vacuum chamber in the filling element.

In FIG. 7 the details of the sample application are shown. Here the base 20 of the machine is oriented with respect to the basket 32 which projects forward of the base 20 sufficiently for the sample carrier to see the chromatographic tape below it. This orientation of the base 20 with respect to the drive and the sample carrier is shown from a different direction in FIG. 4.

A bracket 20' forward of the base of the machine is provided to carry the necessary electrical connections for activation. It can be a complete sheath around the sample carrier or a simple bracket 20' on base 20 as shown.

Carried by bracket 20' are the insulators 120 and 121 which provide a base for receiving the arcuate spring conductors 122 and 123 which respectively carry contact points 124 and 125. The contacts 124 and 125 are formed to engage electrical contacts 112 and 114. The circuit which provides the electrical energy is connected to contacts 124 and 125 by leads, not shown. The circuit may be of any conventional form suitable to deliver the required level of current when it is called for.

Sample carriers consisting of needles 126 and 127 having points 128 and 129 and handles 130 and 131 are in place in their respective sleeves making electrical contact with contacts 112 and 114. A direct current circuit at 12-24 volts is adequate to induce heating of the sleeve resistances.

Under the points of the sample carriers is the tap 24 with areas 318 and 319 in sample receiving relationship. For effectively holding the tape under some tension and to guide it accurately a platform 20", an extension of base 20 is provided. Under the tape 24 and under the platform 20" is located microswitch 251 with lever 251' in contact with the tape. Lever 251' for this embodiment of the invention is held in an "off" position by the tape and when it senses an index in the tape in the form of an opening appropriately related with respect to the chromatographic areas it is lifted to an "on" position. A corresponding opening in the platform permits free movement of the switch. In this position the electrical circuit consisting of spring contacts 122 and 123, 112 and 114, and the sleeves 108 and 109 serving as resistances is activated. The sleeves are heated, the needles are heated and sample is ejected.

The details of the microswitch are shown in FIG. 8, generalized to indicate the manner of use in the several parts of the machine.

In FIG. 8A the tape 24 is shown travelling in the direction indicated by the arrow and in appropriate relationship to microswitch 140 with external lever 141. This structure of microswitch is conventional and has use in this kind of apparatus because the small lever 141 is easily manipulated by the light mechanism. As the tape passes over the microswitch 140 it holds lever 141 in depressed or "off" position. When perforation 150 of the tape is sensed by the lever 141 the lever assumes the position shown in FIG. 8B which is the "on" position. As indicated in connection with FIG. 7 this activates the heating circuit, a small current flows for the instant necessary to heat the sleeves 108 and 109, sample is ejected onto the areas 318 and 319, and then the lagging edge of the perforation 150 depresses the lever 141, and turns off the current after completion of the delivery of the sample. This simple mechanism has great usefulness in this apparatus in that it relies on a mechanical sensing of the presence of the tape in receiving position only in order to deliver the sample.

Similarly, the basket carrier having been indexed accurately into a number one sample delivery position continues its slow rotation for the 36 sample pairs mentioned in connection with this embodiment. The reduction of the gear reducer is selected with respect to the rate of rotation of the main drive shaft and the sample turntable progresses to a second position as the next chromatographic sample receiving area is moved into position. When it is in position switch 251 activates delivery of sample.

It is in this respect and in connection with the structure of circuit shown in FIG. 7 that the structure of the basket with the notches 114 and 115 is clarified. In the unloaded position the contacts 124 and 125 carried by springs 122 and 123 are forward of the position shown in FIG. 7. Passage for setting basket 32 in place is provided by notches 100' and 101'. This is merely a physical passage for slipping the basket past the contacts, whereupon the female portion of the detent and male portion are matched and the basket latched into position with latch 118.

The fundamental operating combination of the machine thus consists of the feed reel and the take-up reel and the arrangement constituting the several chambers, namely, activating and color developing where necessary. Quite often in a chromatographic operation a color reagent development is unnecessary and, accordingly, chambers 47, 50 and 55 can be rendered inactive. Rather than bypass them the tape 24 is merely threaded through them and they are not heated, nor is color reagent applied.

So that conditions can be subjected to the fine degree of control which may be needed to relate to the particular chromatographic problem, each of the zones or chambers is generally subjected to a separate temperature control. This may consist merely of a heater mounted on the wall of the chamber, the degree of heat being controlled, for example, by a potentiometer which has its control incorporated in the control panel of the apparatus. The circuits for so doing have been indicated diagrammatically in terms of a control panel adjacent to the base of the machine. In similar manner the optical scanner, or densitometer, which surveys the finished chromatogram, being of conventional structure, is indicated only diagrammatically. For convenience the controls for the reels, take-up and drive and also for the sample basket are brought to the instrument panel so that the complete apparatus with its working parts is mounted on the base 20, but actually control elements for varying temperatures and speeds of movements of tape through the apparatus are laid out on an instrument panel, beside or conveniently located with respect to the main working panel itself.

It is apparent that the guiding of elongated tape through the machine is essentially reduced to the problem of driving the tape and in certain parts of the operation, at least, one of keeping the tape accurately aligned. Hence, the spools other than the take-up and feed reels are of two basic varieties, the first, spools equipped with teeth to form sprockets for accurate alignment of the tape by engagement of edge perforations, and, the second, spools which guide the tape without disturbing the chromatographically active area. Characteristically, the spools with teeth, or the sprockets, are the driven spools in the apparatus. Teeth matching 35 millimeter film perforations are indicated. This is the characteristic structure of the driven spool, its only feature for purposes of the machine being the two sides equipped with teeth to engage the film. In the mechanism as shown in the FIG. 2, spool 30, spool 30' and spool 36 have such teeth. The purpose here is that between 30 and 30' it is essential that the tape be accurately aligned under the sampling basket and the solvent application means so that the mechanism can be appropriately activated by the tape. It is for this reason that platform 20" is placed under the tape at sample delivery, i.e., to add a bit of tension to insure accurate positioning of the tape. Driven spool 36 carries the teeth positively to engage the tape and to keep it moving. Obviously misalignment can damage the tape though generally it is tough enough to tolerate very substantial misalignment and mishandling.

The construction of the other guide spools is as shown in FIG. 10 where 25 represents the typical spool, as having sides 25' and 25".

Internally, as shown the spool sides are formed with a ledge or step such that the edges of the tape to about the width taken by the perforations are carried on these ledges, as indicated. The rest of the tape does not contact the axis of the spools. The purpose of this construction is to avoid physical contact of the adsorption areas A and B of the tape with any spool or any surface until complete development has occurred. This is a necessity of the operation to avoid contamination of specimens, in fact, to avoid contamination of the machine.

The details of the tape are shown in FIGS. 11–15 and it will be apparent that in the operation, once a chromatographic analysis has been commenced it is desirable that the tape be transported through the operation without having any contact of the chromatographic area with anything other than the sample, the solvent and color development reagents. Similarly, it will be apparent that in passing through the machine as shown in FIG. 2 the number of turns in the delay lines is arranged to have the tape come out with the adsorptive areas of the chromatographtic area facing up. This is merely a convention because the expectation is that the scanning apparatus will be mounted to look down on a tape. For scanning it is perfectly feasible to have a tape come to the take-up reel with the chromatographic area down, but this would necessitate a reorientation of the scanning device. Hence, for standardization purposes only, and for purposes of this machine, the orientation of the tape face upward is maintained.

In FIG. 9A there is shown an alternative sampling pipette for use with an alternative mechanism for delivering sample to chromatographic tape. In the figure which is in longitudinal section, micro pipettes 275–276 have opening nozzles 277 and 278 and at the upper end are characterized by having outwardly flared T-sections 279–280. Generally, micro pipettes of this size are of small enough dimensions that when the nozzles 277–278 are immersed in a liquid, the liquid by capillary action will rise to the top of the pipette. Thus, by standardization of length and diameter it is quite simple to obtain a sequence of pipettes giving uniform size samples within a given degree of precision.

For delivery of the sample from the open pipette a basket corresponding essentially to that shown in FIG. 6 is employed. Provision for heating the sleeves electrically is unnecessary and hence, that circuit can be deactivated. The pipettes are fitted within the sleeves with funnels 281–282, etc. provided at the upper ends.

For delivery of the sample provision is made to have a source of compressed nitrogen 285 connected by conduit 286 to reducing valve 287 to conduit 288, to reducer 289 to conduit 290 to the solenoid valve 291 leading to delivery orifices 292 and 293. The mechanism of indexing the basket into position by the microswitch 251 is the same and solenoid valve 291 is activated rather than a heating circuit. Very small controlled jets of nitrogen directed into the funnels 281–282 accurately deliver the volume of liquid in the sample pipette to the chromatographic areas.

DETAILED DESCRIPTION OF THE TAPE

This aspect of the invention, is, accordingly, embodied in a tape, for example, a plastic tape as a base, the tape being characterized by its having mechanical indicia along its edges to permit precise timed movement of the tape over a timing sprocket, the tape having mounted on a face thereof a strip or strips of chromatographic adsorbent of predetermined width, length, and shape, coordinated with a reservoir for holding a chromatographic solvent, or solvent mixture, the tape being further coordinated with an indicium related to the placement of said reservoir and adsorptive surfaces, the several parts being coordinated so that in forward movement on a timed basis, a test specimen for chromatography can be applied to the surface of the adsorbent in response to one of said indicia, and travel through a development zone and drying zone, and also proceed in response to said indicia to a final stage of inspection, such as, for example, by visual or by optical means, for the identification of each of the zones in the chromatogram.

Thus, the invention broadly is embodied in the combination consisting of a base tape, in the form of reels of any size, which serves as a substrate and spaced strips of chromatographic adsorptive material thereon in spaced sequence, said strips individually being in contact with solvent reservoir pads. The adsorbent coating may be any material, with or without indicating dyes, such as silica gel, alumina, cellulose, derivatized cellulose, microcrystallline cellulose, kieselguhr, ion-exchange resins, polyamide powders, hydroxyapatite, "Celite" diatomaceous earth, "Sephadex" polysaccharide dextran derived powder, zinc carbonate, polyethylene powder, calcium sulfate, magnesium silicate, calcium hydroxide, "Florisil," magnesia-silica gel, and the like, and it is coated on the base in any manner such as by dropping, pouring, dipping, spraying or spreading, to form a thin layer on the substrate upon which mixtures of materials may be separated when the layer is dried.

The base, or tape, may be nylon, Dacron polyester, fiber made from polyethylene terephthalate or other monofilamentous fiber, the only requirement being that it be non-adsorptive and inert. It may vary in thickness, in fiber type, and class and weight. Metal foil is also useful as a substrate. The adsorbents may or may not require the use of a binder such as polyvinylpyrrolidone, polysaccharides, polyethers or calcium sulfate hemihydrate for extra adhesion. A preferred form of film base is the Mylar polyester tape commonly used in photography, and, in particular, in a specific form of our invention is Mylar film, 35 millimeters in width, as used for motion picture film, the adsorptive strips, reservoirs and indicia being applied thereto.

The timing indicia is used in the film may be the conventional perforations along the edges thereof, alone, or they may be an additional perforation located in appropriate relationship to the reservoir, or they may in the form of conductive spots applied to the film in appropriate relation to the reservoir. The advantage of the perforation as an indicium is that in a traverse in an automatic apparatus the leading and lagging edges of the perforation are mechanically detectable with microswitches. The conductive spot is very useful, and can be sensed with electrical contacts and generally conventional microswitches. The magnetic spot is similarly readily detectable.

The construction and arrangement of the invention herein may be better understood by reference to the drawings and detailed description.

FIG. 11 is a side view exaggerated in thickness to show the relationship of chromatographic layer to the film;

FIG. 12 represents a plan view of a single chromatographic combination applied to a tape;

FIG. 13 is a general plan view of length of tape showing a plurality of these chromatographic test strips mounted thereon;

FIG. 14 is a perspective view of a reel of tape showing a sequence of the chromatographic strips;

FIG. 15, a, b, c, d indicates the applicability of shaped strips to the invention.

Referring to FIG. 11, 310 represents a base of monofilamentous material or tape having an upper face, 311, a lower face, 312 and edges 313 and 314. Near each edge are perforations in precisely spaced sequence, namely, perforations 315, 316, 317, etc.

In the clear area between the rows of perforations 315 and 316 are mounted the chromatographic adsorptive areas 318 and 319 which are of a pre-selected length, carefully placed on the strip in relation to indicium 320. A preferred form of indicium is a perforation a few millimeters in width or diameter. Also included in specific relation to indicium 320 is the solvent reservoir or pad 321.

The combination of adsorptive area, indicium and solvent reservoir is repeated at spaced intervals, as frequently as the length of tape being used will permit or less frequently as desired. The tape may further provide at each end a lead area for the indication thereon of data concerning the date, time, operator, chromatographic conditions and nature of the test. By relating the indicium to the test area the application of sample to adsorptive area and solvent to the reservoir can be coordinated with movement of the tape through test apparatus.

It is apparent that while the invention is illustrated in terms of two parallel test areas each about 5 to 8 millimeters in width, and as much as 80 to 100 millimeters in length, that the test area could be a single area approximately 20 millimeters in width or it could be made 3 or 4 chromatographic areas or the like. For general use, it has been found that the parallel pair of areas represents a preferred form. They permit analysis of an unknown sample in one area and a known sample in the adjacent area for comparison. Wedge shape areas as indicated in FIGS. 15, a, b, c, and d are useful for certain applications.

In use the tape can be manually or automatically driven through an analyzing machine which will automatically cause a specimen to be applied to each test area, and also indicate the application of solvent to the reservoir pad. In traversing through the development chamber of test apparatus which is saturated with solvent vapor, the solvent is given time to pass completely through the adsorbent layer and thereby effect separation of a mixture of compounds.

The chromatographic strips 318 and 319, may be of any of a variety of compositions suitable for performing chromatographic separations, or any of a variety of shapes as indicated in figure 315. It is understood that the use of the appropriate adsorbent will depend upon the nature of the compounds which will be separated. Necessary to the development of the chromatogram is a solvent, or mixture of solvents, which will perform the separation in combination with the adsorbent coating in each strip. The reservoir pad 321 has been designated as the material onto which the solvent will be deposited. As indicated, the reservoir pad is squared off and thus provides a base line from which the solvent proceeds to migrate along the chromatographic strip. The material of which the reservoir is made and the adhesive holding it in place should be inert to the particular solvents to be used. Generally, it has been found the polyurethane foams or sponges are particularly useful as reservoir pad material. As solvent pads or reservoirs any material having an open cellular structure, e.g. cellulose, felt, cloth, inert to the sovents and capable of retaining solvent in the amount of 2½ times the volume of the adsorbent layer is useful. They are simply lightly glued in direct contact with the base of each of the chromatographic adsorption strips. Thus, in developing a chromatogram, solvent is applied to the sponge 321, which serves as a solvent reservoir, and provides an accurately-defined base line, and solvent can then migrate along the strips 318 and 319 at a rate determined by its physical properties and the properties of particles making up the strips and by the solvent polarity. It contacts the origin of the chromatogram at positions 322 and 323 and in the course of a few minutes migrates through most of the length of 318 and 319 in order to complete the separation of the mixture of compounds originally deposited at the origin.

Virtually any of the various adsorbents which have been mentioned can be slurried and placed on the monofilament cloth or plastic tape as is done routinely in the usual thin layer plate preparation methods. Depending upon the adsorbent which is placed on the tape alkaloids, amine, amino acids, peptides, proteins, steroids, lipids, carotenoids, chlorophylls, vitamins, quinones, drugs, poisons, antibiotics, phenols, nucleic acids, nucelotide coenzymes, sugars, insecticides, dyes, miscellaneous organic compounds, inorganic ions, and other compounds in need of separation can be separated with this technique.

Specifically, in practicing the invention any of a variety of combinations of substrate with adsorbent can be used, but the following should be considered illustrative.

EXAMPLE I

A monofilament nylon strip, 25 millimeters wide, 0.1 millimeter thick, was coated in pairs of strips with a silica gel slurry, in sequence as shown in FIG. 12, containing a calcium sulfate binder. The strip was hung up to dry. In 15 minutes the strip was completely dry. The coated tape was hung in an oven at 110° C. for 10 minutes and removed, allowed to cool slightly in the air, and was spotted with 4 microliters of Stahl dye mixture. Solvent was applied to sponge 321 and the strip was then placed in a large volume tank saturated with solvent vapor and was developed to 8 centimeters from the origin. The separation of the three dyes was complete and took 6 minutes, the butter yellow, indophenol blue, and Sudan Red G formed distinct spots, well separated.

Depending upon the thickness of the slurry used to coat these nylon strips, the time for development will vary. The thicker the layer on the strip, the longer will be the development time.

EXAMPLE II

A length of monofilament cloth 25 millimeters wide, 100 centimeters long, and 0.1 millimeter thick was pulled through a slurry, and was wiped off with a doctor blade to remove excess slurry. With this method, a continuous strip of evenly coated monofilament nylon was made. This strip was air-dried and then cut into sections corresponding to 18 and 19 of FIG. 2 for individual chromatographic separations. The sections are glued on tape. A sponge reservoir then is glued in contact therewith, solvent is applied to the sponge and the operation completed as described in connection with Example I.

EXAMPLE III

A 35 millimeter Mylar tape, 0.1 millimeter thick, was masked to leave parallel spaced strips uncovered, and sprayed with a silica gel slurry containing 1 percent NP-90 Polyvinylpyrrolidone as binder. The tape was allowed to air dry for 30 minutes, and sponges were applied as indicated in FIG. 2. The coated strips were activated for 10 minutes at 110° C. The coated strips were activated with 4 microliters of 0.1 molar solutions of o-nitroaniline, m-nitroaniline and p-nitroaniline in benzene. The coated strips were then passed into a chromatographic chamber saturated with solvent vapor, the sponge activated with 0.5 milliliter phenol-water (8:3) solvent and the strips developed to 10 centimeters from the origin. The 3 components separated completely, to give $R_f$ values of 0.55, 0.44 and 0.37, respectively.

In recapitulation it is to be understood that the chromatographic adsorption device constituting this aspect of the invention consists of the flexible non-absorptive and non-adsorptive substrate serving as a carrier for adsorptive areas arranged to receive samples and to be in contact with a solvent reservoir, the combination being oriented in a fixed defined relationship with an indicium, preferably a perforation in the substrate, by arranging the combination in linear repetitious sequence along a tape. The several indicia can serve to provide together signals for sample application, solvent application, etc. and other intelligence built into a sequence where the operation involves a sequence of tests. The hole is incorporated in the tape to be used in combination with an automatic chromatographic apparatus, but it should be clear that the tape can be manipulated manually through an apparatus.

The adsorptive materials which may be used in the chromatographic layers are subject to virtually infinite variation and will vary depending upon the requirements of the tests to be conducted. For example, U.S. Pat. 3,418,152, W. S. Staudenmayer et al., issued Dec. 24, 1968, discloses a large group of specific exemplary formulations for laying down chromatographically active layers on a substrate and that disclosure may be considered fully incorporated herein. Similarly, U.S. Pat. 3,415,158, E. S. Perry et al., issued Dec. 24, 1968, also discloses a number of specific formulations and it may be considered fully incorporated herein.

OPERATION

It is useful to trace the operation of the machine with the aid of FIGS. 2 and 3. It is understood that the basic operation of conducting an analysis with the machine is to have chromatographic adsorption areas laid out in linear form successively on tape. Standard 35 millimeter photographic film formed of Mylar polyester tape is satisfactory from the standpoint that it is available in unlimited quantity and is relatively inexpensive. A reel of the film, of course, is provided with perforations and it is well adapted for being transported through a machine, such as the instant one by use of sprockets. It is prepared for chromatographic analysis by applying to spaced areas on a face thereof, chromatographically active areas approximately 10 centimeters in length and perhaps half of one centimeter in width, generally two areas side-by-side, the areas being contact with a sponge at one end. The position of the areas and sponge is marked by an indicium. A perforation close to the sponge area is preferred. Details of a suitable chromatographic tape are set forth in this application by reference to FIGS. 11, 12, 13, 14, 15 and portion of this specification which corresponds to application Ser. No. 93,299 filed of even date herewith, and fully incorporated herein.

A long lead generally, perhaps 6–10 meters is provided on the tape. This is to permit threading it through the machine so that the first chromatographically active area is near the feed reel.

Thus, referring now to FIG. 2 the prepared, chromatographically active tape mounted on the reel 21 is set in place on axis 22, being keyed thereto in conventional style and the lead portion of the tape is threaded through activation zone 27, separation zone 33, reaction zone 50, solvent application zone 55, drying zone 65, to take-up reel 71. In the threading operation it is important that the several microswitches identified as 250, 251, 253, 254, 255, be set in their appropriate positions. This is done manually by gently tilting the terminal of the microswitch and holding it in the position by the tape which is stretched over it. Switch 250 senses continuous tape; the others the indicia. The loading of a machine is of course facilitated by the removable or hinged covers on the several zones. The machine is adequately loaded when the tape is in place with no slack.

The several chambers or zones are preheated to appropriate temperature for the analysis to be conducted. Thus, activation zone 27 will require a certain temperature level depending upon the nature of the adsorbent of the chromatographic tape. Separation zone 33 will call for a temperature level depending upon the solvent used and the separation to be accomplished. Reaction zone 50 takes its temperature as determined by the reactant used to develop color spots on an otherwise colorless chromatogram emerging from the separation zone. The solvent application or development zone 55 will take its temperature from the requirement for visualization of the chromatogram which has been separated. Generally, drying zone 65 will have a fixed temperature determined by the solvent used. The purpose of zone 65 is to produce a dry chromatogram to present to the optical scanner 68.

Having threaded the tape into place and set appropriate temperatures throughout the several portions of the apparatus, sample basket 32 is set in place on its shaft and indexed to the No. 1 position.

That is, the No. 1 samples are set in a position such that when the moving tape brings a chromatographically active area into sample receiving position, sample #1 is in position for delivery. The tape indicium activates the delivery of the sample.

With the activation of the motor drive the first sample on the chromatographic area passes up through the activation zone and when the chromatographic area reaches a position suitable for application of sample microswitch 251 is released, circuit is closed, the sample ejected onto the chromatographic areas. (See FIGS. 8A–B–C). The tape then moves to enter the separation zone 33 and as it enters the zone the perforation in the tape, or the indicium, related to the adsorption area releases microswitch 253 which activates the solvent application. Solvent is applied to the sponge area in contact with the chromatographically active area and the sample enters the separation zone. From this point separation occurs in an atmosphere saturated with solvent and when the tape emerges it passes over applicator 48 to receive color developer. In zone 50 full color is developed or reaction is developed and in zone 55 solvent vapor induces full visualization of the color. Extra solvent as needed can be provided in a tray in the chamber. Following this, solvent is dried out of the sample in zone 65, scanning occurs by activation of the microswitch 254 which regulates the operation of the scanner. That is, the chromatogram passes over the microswitch, it turns on the scanner and after the scanning, the indicium trips the second microswitch 255 to turn the scanner off. If these are two chromatographically active areas and two chromatograms, twin scanners are used. The scanning is coordinated automatically with the sample and it will be apparent that with these chromatograms being produced in linear sequence as described the sequence of chromatograms will correspond exactly with the sequence of chromatograms on the tape. Recording apparatus for the recording of intensity of the color is readily available and utilized for this purpose. It is also useful to provide an integrator printout as indicated in FIG. 2.

In commencing a sequence it is necessary only to provide that the sample basket is indexed into a known sample delivery position in relation to a particular chromatographic area on the tape. That as since the chromatographic areas come up to the basket in linear seqeunce the identification of the sample in the basket with the first area contacted is all that is needed to have the scanning record or printout directly related to the indexing and the travel of the tape through the machine. Each step is activated by the indicium on the tape. Upon completion of the sequence of analysis, i.e., when the final chromatogram has been scanned, the terminal tape will be freed of reel 21, tension of the tape will be relaxed, microswitch 250 released and the magnetic clutch 82 deactivated, and movement of the tape stopped. Sample basket 32 merely moves in synchronism with the tape and no sample delivered unless the sample delivery circuit is activated by an adsorptive area in place to receive sample. Each of the chambers, scanners, printout, motor and pump, is controlled by its own circuit in conventional style and the circuits and arrangement thereof form no part of the invention. These circuits are indicated in block diagram form only.

Using the machine as described herein and a chromatographic tape also as described herein, employing a cellulose MN 300 adsorptive material in the adsorptive areas, a typical analysis illustrating variables and routine efficacy of the machine in the separation of cystine, alanine, histidine and leucine indicates reproducibility.

Thus, a mixture of the four amino acids in the following proportions was prepared:

|  | Grams per liter | Molarity (mM.) |
|---|---|---|
| Cystine | 1.929 | 8 |
| Alanine | 0.525 | 6 |
| Histidine | 1.242 | 8 |
| Leucine | 0.262 | 1.9 |

Samples of the mixture were loaded in the basket in the application zone of the machine. The tape speed was established so that the final drying in zone 65 took place at a temperature of 110° C. for 4½ minutes. The actual development of the chromatogram in zone 33 under these conditions was carried out for a period of 50 minutes at 30° C. That is, the transit time for the tape through the zone was 50 minutes. At zone 32 two micro-liters of the mixture was applied to each of the chromatographic areas of the tape. At the solvent application point pump 44, through catheter 42, delivered 0.6 milliliter of a normal butanol-acetic acid-water mixture, volume ratio 12:3:5+0.4% nihydrin on the solvent pad. With the tape thus proceeding through the machine and speed such that these rates were maintained a full sequence of automatic analyses were conducted with the chromatographic areas arranged in parallel pairs, designated L–R. The separations can be judged from the following table of data showing the $R_f$ values of a sample of the analyses. These are the figures obtained from the Integrator Printout and reflect directly the graphical data produced by the Optical Scan and Recorder.

| Chromatogram Number | $R_f \times 100$ | | | |
|---|---|---|---|---|
|  | Cystine | Histidine | Alanine | Leucine |
| 23L | 31 | 38 | 69 | 93 |
| 23R | 30 | 36 | 68 | 96 |
| 22L | 33 | 37 | 70 | 93 |
| 22R | 31 | 38 | 64 | 93 |
| 24R | 33 | 38 | 69 | 93 |
| 25R | 37 | 32 | 64 | 89 |
| 26R | 30 | 34 | 66 | 93 |
| 26L | 29 | 37 | 68 | 95 |
| 27L | 33 | 37 | 70 | 93 |
| 28L | 30 | 37 | 72 | 98 |
| 28R | 29 | 36 | 67 | 93 |

$R_f$ has its established meaning in the art, namely, $$R_f = \frac{d \text{ Sample}}{d \text{ Solvent}}$$

where $d$ is the distance travelled from the origin.

As in any chemical analyses the value obtained from a group of repeated analysis is taken as the mean and the level of precision is measured by the mean deviation from the mean. In this instance the degree of precision was considered good. That is, reproducibility is better than about ±3% in routine use and in certain situations is better than ±2%.

It will be apparent from the variables given that a single analysis is conducted in an interval of approximately one hour, but where the machine employs tape and successive analyses are commenced at intervals of about a minute, a very large number of analyses will be completed in the space of an hour or more, with time lag of an hour allowed for the first analysis to come through. The total analytical time for the group is measured as the interval between the first analysis and the last. Amino acids illustrate the effectiveness of the machine because they are alike, not easy to separate, and are of interest in the use of a machine of this character in the routine conduct of analyses of the amino acids of humans, e.g., newborn babies.

What is claimed is:

1. Apparatus for conducting chromatographic analyses in sequence comprising a base, a first reel of flexible tape mounted on said base of said apparatus, said tape carrying spaced chromatographically active areas, indicia on said tape placed in relation to said active areas for activation of separate parts of said apparatus, means to guide said tape over activating means, said activating means serving to induce the application of a sample to the chromatographically active area on said tape to fix an origin, means for applying solvent to a solvent reservoir in contact with the chromatographically active area on said tape, and means to provide for a development and drying of a chromatogram on said active area, and means to gather said tape at a second reel mounted on a said apparatus, said several means for applying solvent and gathering said tape on said reel being responsive to said indicia on said tape.

2. An apparatus in accordance with claim 1 which includes means to activate chromatographic areas of said tape between said first reel and said sample application means.

3. An apparatus in accordance with claim 1 which includes between said solvent application means and take-up means a chromatographic development delay zone.

4. An apparatus in accordance with claim 3 which includes between said chromatographic development delay zone and said take-up means, a color reaction development zone.

5. An apparatus in accordance with claim 4 which includes between said color reaction development zone and said take-up zone, a color development zone.

6. An apparatus in accordance with claim 4 which includes a drying zone.

7. An apparatus in accordance with claim 5 which includes prior to said take-up zone, a scanner for optical analysis of the developed chromatogram.

8. An apparatus in accordance with claim 5 having a color development reagent reservoir in contact with said moving chromatographic surface immediately prior to its entering said color reaction oven.

9. An apparatus in accordance with claim 8 wherein optical scanning means responsive to said indicia for scanning chromatograms is provided prior to the tape take-up.

10. An apparatus for conducting chromatographic analyses in time sequence comprising a base, a first reel of flexible tape mounted on said base, said tape carrying thereon spaced chromatographically active areas and indicia related to said active areas for activation of the apparatus, means passing said tape through an activation zone, means guiding said tape over indicia responsive means for initiating application of a sample to the chromatographically active area on said tape to fix an origin thereon, means responsive to said indicia for applying solvent to a solvent reservoir on said tape in contact with the chromatographically active area, means for development delay enclosing an atmosphere of solvent to provide for development of a chromatogram, means thereafter to apply a color reagent to said chromatographically active areas, means to permit development of color at a color development temperature comprising an enclosed zone passing said tape for an interval of time, color development means comprising an enclosed zone for full development of color, and a drying zone to remove solvent from said chromatographically active areas and means after said drying zone responsive to indicia to scan the developed chromatogram and final means to receive said tape.

11. Apparatus for carrying a plurality of samples for use in automatic chromatographic equipment including means for automatic ejection of sample onto appropriately placed chromatographically active test area which comprises a first and second disk mounted in fixed spaced axial relationship to each other, said disks having radially spaced openings, the openings in each disk being axially aligned with those in the other, thereby to make possible carrying a plurality of sample needles in said openings, electric contact surrounding each of said openings and electrically resistant sleeves connecting said openings to provide for electrical connection from said first disk through sleeves surrounding samples to said second disk.

12. A chromatographic apparatus suitable for performing a plurality of chromatographic analysis automatically in sequence which comprises a base, a first reel mounted on said base, said reel being adapted to carry elongated tape carrying a plurality of chromatographic test areas thereon, guide means for passing said tape through an activation zone, means responsive to indicia on said tape to activate a sample ejector to apply a sample on said test area, means guiding and driving said tape to a solvent application zone to receive solvent and thereafter, into a chromatographic development zone, delay means in said chromatographic development zone to permit time for development of a chromatogram, means guiding and driving said tape into a color reaction zone, and, finally, a solvent drying zone and means guiding said tape through a chromatographic scanning device and finally means guiding said tape to a final tape reel.

13. A chromatographic apparatus in accordance with claim 12 which includes a color development zone after said color reaction zone.

14. A chromatographic apparatus in accordance with claim 13 wherein chromatographic scanning device is an optical scanning and recording means.

15. An apparatus in accordance with claim 14 wherein said optical chromatograms are produced in the same sequence as the chromatograms on said tape.

16. A method of conducting a plurality of chromatographic analyses in a time sequence which comprises, providing a sequence of chromatographically active areas on a flexible tape as a base, passing said base with the chromatographically active areas coordinated with indicia through an activation zone for activating the area, thereafter in a continued sequence, applying sample to said chromatographically active area, applying solvent to a solvent reservoir in contact with said chromatographically active area, and, passing said tape into a time delay zone to permit development of a chromatogram, and, thereafter, drying and storing said sequence of chromatographically developed chromatograms.

17. The method in accordance with claim 16 which includes applying a color development reagent to said chromatogram, developing color therein and thereafter drying and surveying the developed chromatogram.

18. A method in accordance with claim 17 wherein said surveying of the developed chromatogram is completed optically by means of a scanner and recording.

19. Apparatus for conducting chromatographic analyses in sequence employing separated chromatographically sensitive areas on a tape in linear sequence which comprises, a first reel as a feed reel for said tape mounted on a base, means responsive to indicia on said tape to activate an activation zone, means in said zone to permit said tape to enter and to leave said zone, means to direct said tape to a sample receiving zone, and means responsive to indicia on said tape to deposit a sample on a chromatographically active area on said tape when said area is in appropriate spaced relation to said sample depositing means, means responsive to indicia on said tape to effect application of solvent to a solvent reservoir area on said tape in contact with chromatographically active area, a chromatographic separation zone comprising means receiving said tape to permit time delay while enclosing said tape in an atomsphere saturated with solvent vapor, said separation zone having means for egress for said tape, means for application of color development reagent to said tape, means for enclosing said tape in a zone to develop reaction thereon, a solvent applying zone and a final zone constituting a drying zone for removal of said tape, means on said machine to activate automatic optical scanning of chromatographically active areas, and means to terminate said scanning when it is complete and final means for receiving a developed and scanned tape, said several means coordinated with said scanning means so that automatic recording of the scanning is identified with the chromatographically active area which is scanned.

20. A method for conducting chromatographic analyses in sequence comprising employing a sequence of chromatographically active adsorptive test areas on a movable tape substrate provided with indicia related to said test areas, sequentially in response to said indicia applying samples to be analyzed to said test areas, then applying solvent to reservoir areas in contact with said test areas subjecting said test areas and solvent reservoir to development and, thereafter, drying said development chromatogram.

References Cited

UNITED STATES PATENTS

| | | | |
|---|---|---|---|
| 3,331,665 | 7/1967 | Natelson | 23—253 R |
| 3,368,872 | 2/1968 | Natelson | 23—253 R |
| 3,413,842 | 12/1968 | Hecker | 73—61.1 C |
| 3,474,031 | 10/1969 | Blondell | 210—198 C |
| 3,487,678 | 1/1970 | Thomson et al. | 73—61.1 C |
| 3,504,376 | 3/1970 | Bednar et al. | 23—230 R |

MORRIS O. WOLK, Primary Examiner

R. E. SERWIN, Assistant Examiner

U.S. Cl. X.R.

23—253 R; 73—61.1 C; 210—31 C, 198 C